United States Patent
Peterson

(10) Patent No.: US 8,442,182 B2
(45) Date of Patent: May 14, 2013

(54) ANNULAR CORE LIQUID-SALT COOLED REACTOR WITH MULTIPLE FUEL AND BLANKET ZONES

(75) Inventor: Per F. Peterson, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/184,161

(22) Filed: Jul. 15, 2011

(65) Prior Publication Data
US 2012/0027156 A1   Feb. 2, 2012

Related U.S. Application Data

(63) Continuation of application No. PCT/US2010/030622, filed on Apr. 9, 2010.

(60) Provisional application No. 61/167,899, filed on Apr. 9, 2009.

(51) Int. Cl.
*G21C 19/00* (2006.01)

(52) U.S. Cl.
USPC ........... 376/264; 376/260; 376/261; 376/347; 376/380

(58) Field of Classification Search .............. 376/260, 376/261, 264, 347, 354, 355, 361, 381, 382, 376/395, 399, 458
See application file for complete search history.

(56) References Cited

U.S. PATENT DOCUMENTS

| | | | |
|---|---|---|---|
| 3,136,700 A * | 6/1964 | Poppendiek et al. | 376/354 |
| 3,671,392 A * | 6/1972 | Beaudoin et al. | 376/173 |
| 6,865,245 B2 * | 3/2005 | Bazant | 376/381 |
| 7,978,807 B2 * | 7/2011 | Ikeda et al. | 376/381 |

FOREIGN PATENT DOCUMENTS

| | | |
|---|---|---|
| KR | 2003-0045687 A | 6/2003 |
| KR | 10-2004-0002999 A | 1/2004 |
| KR | 10-2007-0055595 A | 5/2007 |
| KR | 10-0772063 B1 | 10/2007 |

OTHER PUBLICATIONS

KIPO, international search report and written opinion issued on Jan. 24, 2011, related PCT Application No. PCT/US2010/030622, including application and claims searched, pp. 1-56.
Kadak, A. et al.—"Pebble Flow Experiments for Pebble Bed Reactors"—2nd Int. Topical Mtg. on High Temp. Reactor Technology, Inst. of Nuclear and New Energy Technology, Beijing, China, Sep. 22-24, 2004, pp. 1-25.

* cited by examiner

*Primary Examiner* — Jack W Keith
*Assistant Examiner* — Marshall O'Connor
(74) *Attorney, Agent, or Firm* — John P. O'Banion

(57) ABSTRACT

A liquid fluoride salt cooled, high temperature reactor having a reactor vessel with a pebble-bed reactor core. The reactor core comprises a pebble injection inlet located at a bottom end of the reactor core and a pebble defueling outlet located at a top end of the reactor core, an inner reflector, outer reflector, and an annular pebble-bed region disposed in between the inner reflector and outer reflector. The annular pebble-bed region comprises an annular channel configured for receiving pebble fuel at the pebble injection inlet, the pebble fuel comprising a combination of seed and blanket pebbles having a density lower than the coolant such that the pebbles have positive buoyancy and migrate upward in said annular pebble-bed region toward the defueling outlet. The annular pebble-bed region comprises alternating radial layers of seed pebbles and blanket pebbles.

17 Claims, 9 Drawing Sheets

ANNULAR CORE LIQUID-SALT COOLED REACTOR WITH MULTIPLE FUEL AND BLANKET ZONES

CROSS-REFERENCE TO RELATED APPLICATIONS

This application a 35 U.S.C. §111(a) continuation of PCT international application serial number PCT/US2010/030622 filed on Apr. 9, 2010, incorporated herein by reference in its entirety, which is a nonprovisional of U.S. provisional patent application Ser. No. 61/167,899 filed on Apr. 9, 2009, incorporated herein by reference in its entirety. Priority is claimed to each of the foregoing applications.

The above-referenced PCT international application was published as PCT International Publication No. WO 2011/040989 published on Apr. 7, 2011, and is incorporated herein by reference in its entirety.

STATEMENT REGARDING FEDERALLY SPONSORED RESEARCH OR DEVELOPMENT

This invention was made with Government support under Contract No. DE-FC07-05ID14669 awarded by the DOE-NE Nuclear Energy Research Initiative. The Government has certain rights in the invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to an annular core for a nuclear reactor, and more particularly to an annular core for a pebble bed reactor.

2. Description of Related Art

Annular Pebble Bed Advanced High Temperature Reactors (PB-AHTR) are known for their low-pressure, chemically inert liquid-salt coolant, high heat capacity and capability for natural circulation heat transfer. They generally provide robust safety (including fully passive decay-heat removal) and improved economics with passive safety systems that allow higher power densities and longer-term scaling to large reactor sizes [>1000 MW(e)] for central station applications.

Recent studies show that the annular PB-AHTR would be a transformation energy technology, capable of being deployed in a variety of power levels (up to multiple gigawatts) to meet the needs of electricity generation and process heat applications. Construction costs are estimated to be substantially below those for current modular helium reactor (MHR) technology and below those for light water reactor (LWR) technology as well. Fuel utilization will be substantially better than for LWRs and MHRs, and recent studies have demonstrated the capability to operate with thorium seed/blanket core configurations for both open and closed fuel cycles as well as use for LWR spent fuel transuranics transmutation.

An object of the present invention is to provide an improved core design to provide better neutron shielding for structures and improved neutron economy in pebble bed reactors, among other improvements.

BRIEF SUMMARY OF THE INVENTION

An aspect of the invention is a liquid fluoride salt cooled, high temperature reactor, comprising a reactor vessel, and a pebble-bed reactor core contained in the reactor vessel, the reactor core having top and a bottom; wherein the reactor core comprises a pebble injection inlet located at a bottom end of the reactor core and a pebble defueling outlet located at a top end of the reactor core and is cooled by a liquid fluoride salt coolant. The reactor core comprises an inner reflector, outer reflector, and an annular pebble-bed region disposed in between the inner reflector and outer reflector, the annular pebble-bed region comprising an annular channel configured for receiving pebble fuel at the pebble injection inlet. The pebble fuel comprises a combination of seed and blanket pebbles having a density lower than the coolant such that the pebbles have positive buoyancy and migrate upward in said annular pebble-bed region toward the defueling outlet. The annular pebble-bed region comprises a pebble injection annulus extending from the pebble injection inlet, the pebble injection annulus leading into a diverging conical region at the bottom end of the reactor core, and converging conical region leading into a pebble defueling slot at the top end of the reactor core, wherein the annular pebble-bed region comprises alternating radial layers of seed pebbles and blanket pebbles.

Another aspect is a liquid fluoride salt cooled, high temperature reactor, comprising a reactor vessel and a pebble-bed reactor core contained in the reactor vessel, wherein the reactor core comprises a pebble injection inlet located at a bottom end of the reactor core and a pebble defueling outlet located at a top end of the reactor core, and is cooled by a liquid fluoride salt coolant. The reactor core comprises an inner reflector, outer reflector, and an annular pebble-bed region disposed in between the inner reflector and outer reflector, the pebble-bed region comprising an annular channel configured for receiving pebble fuel at the pebble injection inlet. The inner reflector comprises an inlet plenum, wherein coolant from the inlet plenum is injected into the annular pebble bed region via a plurality of inner injection ports in the bottom end of the pebble bed region. The outer reflector comprises a plurality of outlet ports in the top end of the pebble bed region, with the outlet ports leading to an outlet plenum. The pebble bed region is configured such that the coolant exits the core primarily into the outlet ports in the outer reflector, and the location of the coolant injection and outlet ports is selected to generate a radially outward and upward flow of coolant through the pebble bed region.

Another aspect is a method for fueling a liquid fluoride salt cooled, high temperature reactor, comprising the steps of providing a reactor vessel comprising a pebble-bed reactor core contained in the reactor vessel, the reactor core comprising a inner reflector, outer reflector, and an annular pebble-bed region disposed in between the inner reflector and outer reflector wherein the pebble fuel is injected into annular pebble-bed region as alternating layers of seed pebbles seeds and blanket pebbles.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 9. It will be appreciated that the apparatus may vary as to configuration and as to details of the parts, and that the methods may vary as to the specific steps and sequence, without departing from the basic concepts as disclosed herein.

Figure 1:
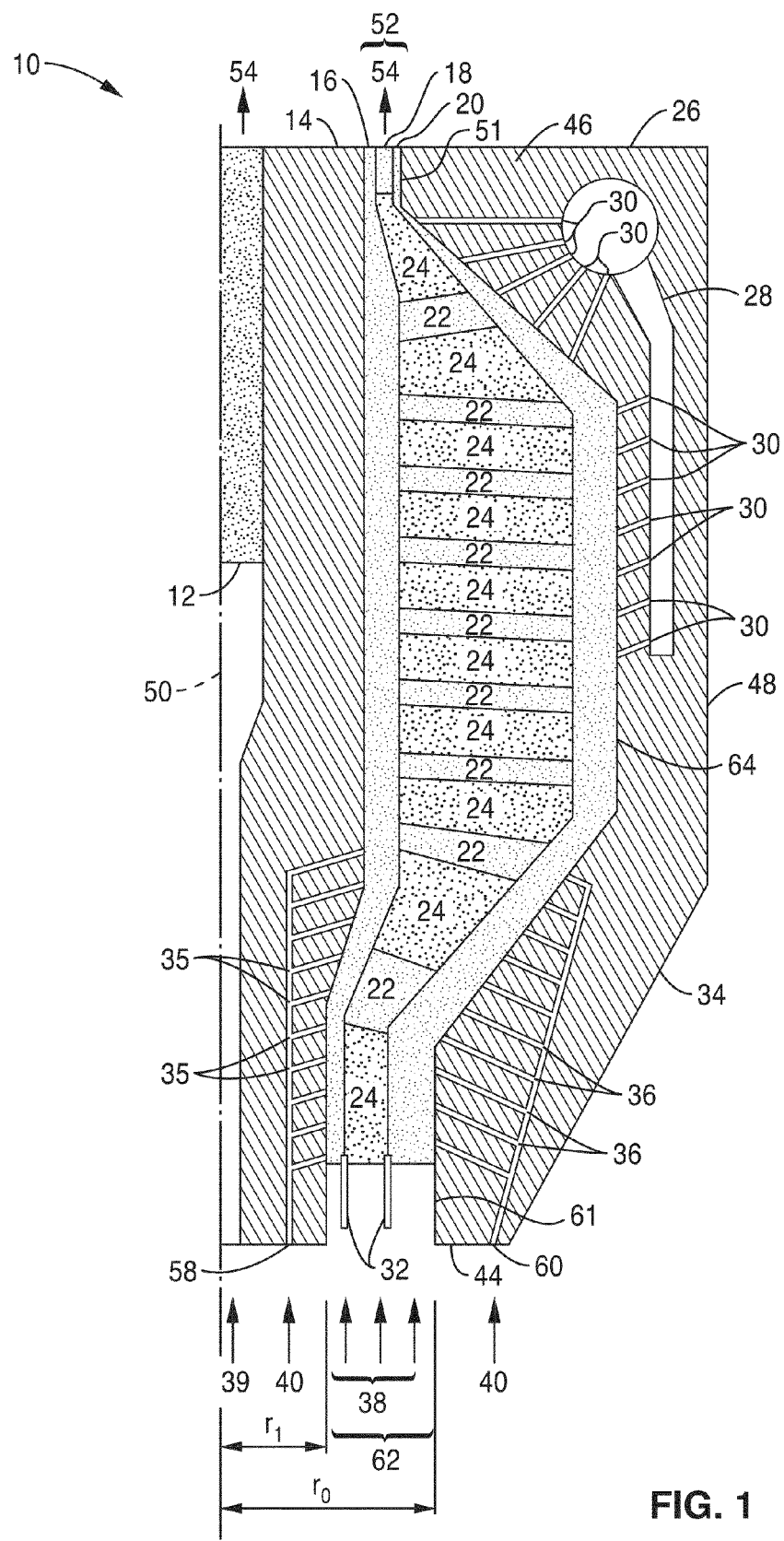
FIG. 1 is schematic view of a radially and axially zoned PB-AHTR core in accordance with the present invention.

FIG. 1 illustrates a schematic diagram of a sectional view of an annular Pebble Bed Advanced High Temperature Reactor (PB-AHTR) core 10 using a combination of radial axial zoned pebble bed. The sectional view of FIG. 1 illustrates one side of a section of the core 10 that is symmetrical about axis 50. The core 10 comprises pebble bed 64 comprising a driver fuel zone 18 disposed between an inner radial pebble blanket 16 and outer radial blanket 20.

The pebble bed 64 is shown in FIG. 1 as having three radial layers or zones (driver fuel zone 18 and an inner/outer radial blanket pebble zones 16, 20). However, it is appreciated that any number of radial zones may be used, although optimally, the number of radial zones will vary between 3-6 zones.

The pebble bed 64 is positioned between inner radial reflector 14 and outer radial reflector 26. At the center of the core 10 is center blanket and seed pebble control channel 12, which is disposed within the inner radial reflector 14. The control channel is shown half full in FIG. 1. However it is appreciated that this level may be varied by increasing or decreasing the delivery of seed or blanket pebbles 39 into the center channel 12 to adjust the total inventory and control the reactivity of the core.

Figure 3:
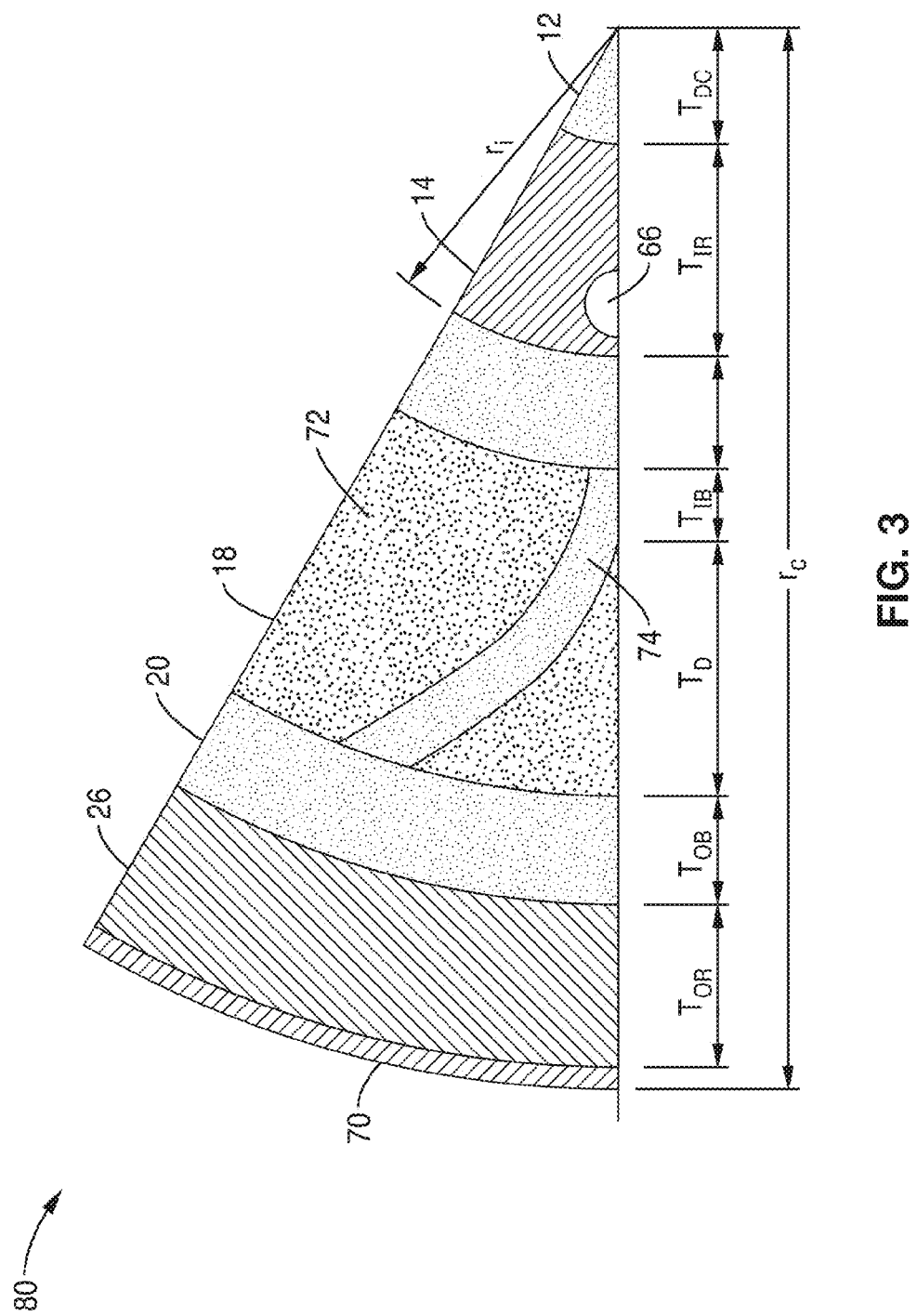
FIG. 3 is a schematic diagram of a simplified model for parametric studies illustrated in cylindrically symmetric, simplified 3-D representation.

The inner and outer pebble blanket zones 16, 20 generally comprise graphite, thorium or uranium blanket pebbles. In a preferred embodiment of the present invention, the central driver fuel zone 18 (or zones) is occupied by alternating axial layers of seed 24 and blanket 22 pebbles. Alternatively, the inner driver fuel zone may comprise azimuthally zoned regions of seed and blanket pebbles, as shown in FIG. 3.

As with typical PB-AHTR designs, the pebbles of core 10 float and are injected at inlet 62 and into pebble injection annlus 61 at the bottom 44 of the core and removed from defueling chutes (not shown) located at the outlet slot 52 above the top of the core 46. In alternative embodiments where the liquid coolant has lower density than the pebbles, the pebbles may be injected from the top and removed from the bottom of the reactor.

The blanket pebbles, as provided in inner blanket zone 16, outer blanket zone 20, or radial zones 22 serve two primary roles.

First, the radial blanket pebble zones provide neutron shielding to reduce fast neutron dose (neutrons with energy greater than 100 keV) to the inner and outer graphite reflectors 14, 26, sufficiently to allow a long time interval to replacement (with life-of-plant being the design goal for the outer radial reflector). The lifetime of the inner and outer graphite reflectors 14, 26 may also be controlled by erosion by sliding pebbles; wherein the salt provides lubricity and reduces erosion. The degree to which the radial reflectors can be shielded is also impacted by the need for the inner reflector to house shutdown rod channels 66, and the outer reflector to potentially house control rod channels (not shown, control rods may also be placed in the center reflector). Because the major effect of the thorium blankets is to moderate high-energy neutrons and absorb epithermal neutrons, the effectiveness of the shutdown and control rod channels, where thermal neutron absorbing poisons are inserted, will depend primarily upon how the inner radial blanket effects the reflection of thermal neutrons.

Second, the radial 16, 20 and axial 22 breeding blankets improve the neutron economy, by breeding U-233 from Th-232. A typical 900 MWth annular PB-AHTR may have 3.0 million pebbles. The typical recirculation time for a pebble in a PB-AHTR will be 5 to 30 days, corresponding to pebble defueling and injection rates ranging from 7.0 to 1.2 Hz. This can be compared to the 27.0-day half-life of protactinium-233, formed by neutron capture in Th-232. By storing blanket pebbles outside the core for a sufficient period of time to allow the optimal decay of Pa-233 to U-233, these blanket pebbles can become a more effective source of fissile material within the PB-AHTR fuel cycle.

The core 10, as embodied in FIG. 1, is configured to have a coolant flow distribution with an upward and outward, transverse flow velocity component. To achieve this, both the inner and outer radial reflectors 14, 26 are designed to have small flow resistances in the vertical direction. Coolant 38 and 40 is distributed into the core via the pebble bed inlet 62 and inputs 58 and 60. The inner reflector 14 comprises the coolant inlet plenum 58 that is connected to the pebble bed 64 via a plurality of inner injection ports 35, and thus is filled with relatively high pressure, cold coolant that flows out radially along the height of the inner reflector 14. The bottom region of outer reflector 26 may also comprise a plurality of outer injection ports 36 that inject coolant into the core pebble bed 64. The outer reflector 26 comprises outlet collection plenum 28, and thus is filled with relatively low pressure, hot coolant flowing radially outward from outlet suction ports 30 along the height of the reactor core. The radial leakage flows in the inner and outer reflectors 14, 26 establish a transverse flow of coolant across the core 10.

Inner reflector 14 not only comprises channels for the coolant ports 35, but also for reactivity control elements such as control channel 12, and other instruments such as in-core neutron flux measurement instruments (not shown).

Figure 2:
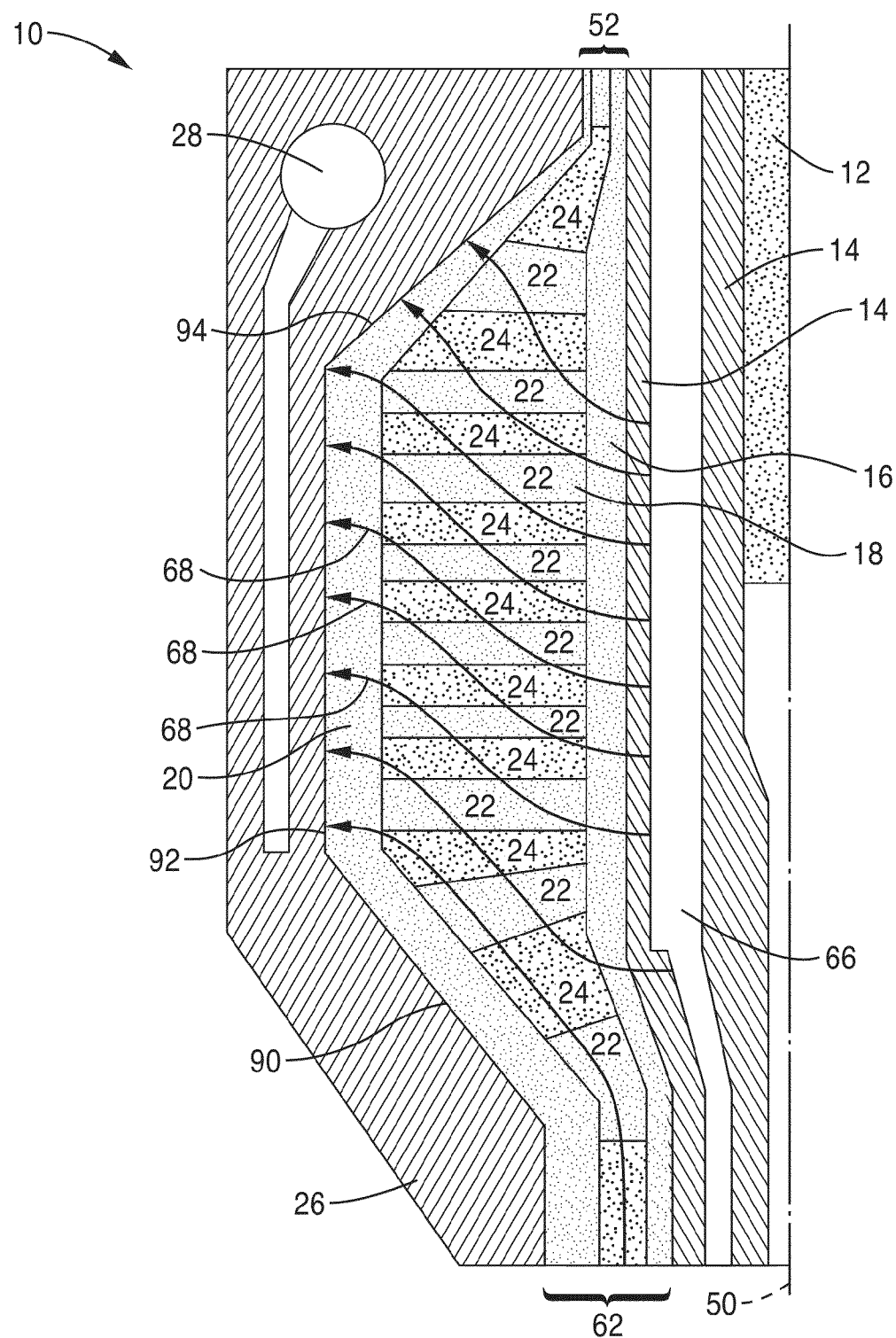
FIG. 2 illustrates a different sectional view of the core of FIG. 1

As shown in FIG. 2, illustrating a sectional view of the core 10 passing through shutdown rod channel 66, combination of the axial and transverse coolant flow causes streamlines 68 to cross multiple seed pebble layers, increasing the uniformity of the coolant heating.

Properly optimized to allow for pebble sliding on the outer reflector 26 inner surfaces, the transverse flow of the present invention has a number of significant advantages. First, transverse flow greatly reduces the pressure drop and pumping power required to circulate the coolant 40. This reduction in pressure drop is an important improvement for several reasons. Second, it allows for more uniform heating of the coolant 40. More uniform heating of the coolant 40 reduces the difficulty of adequately mixing the coolant in the outlet plenum 28 (to avoid imposing fluctuating temperatures on metallic components in the hot leg), and reduces peak fuel temperatures. Referring back to FIG. 1, a plurality of partitions 32 is used at the bottom 44 of the annular PB-AHTR core 10 at inlet 62 to enable the radially-zoned injection of pebbles. Because pebbles bounce when they land, to generate a radially-zoned core it is necessary to have dividing partitions between the different pebble zones where the pebbles are added to the core. Axial zoning is achieved by alternating the injection of seed 24 and blanket pebbles 22. Because the partitions 32 are in direct contact with the pebbles and the salt coolant, they are preferably constructed from a robust material capable of withstanding the resulting neutron flux, temperature, and corrosion.

If the pebbles are deposited in uniform radial zones at the surface of the bed, then the bed can be expected to preserve the radial zoning as the pebbles move through the core 10, because pebble beds move largely in plug flow. Plug flow is generally characterized as flow without substantial induced shear from the internal walls, thus preserving radial zoning and minimizing pebble dispersion between radial zones.

The core 10 of the present invention achieves radial zoning via a diverging region 90 at the bottom of the core. Of physical necessity, diverging motion of the pebbles results in limited shearing of the pebble bed, and limited but acceptable radial dispersion of pebbles. The outside radius $r_o$ of the core diverges with a substantially larger angle than the inside radius $r_i$, such that with plug flow of the pebbles the radial thickness occupied by driver pebbles drops rapidly toward the bottom 44 of the core. This makes the bottom 44 of the core subcritical, and thus reduces neutron fluence in this area (as occurs in the defueling chute of pebble bed reactors). This in turn makes it possible to locate the partition rings 32 in an area of sufficiently low neutron fluence to permit long life, particularly if the material is capable of withstanding large neutron fluences (e.g., oxide dispersion strengthened ferritic steels). It should be remembered that the dividing rings 32 that control the pebble landing locations are subjected to low mechanical stress.

The pebble bed core 64 then opens to a larger constant cross-section region 92 at the middle of the core 10 prior to entering a converging section 94. In the constant cross-section region of the core the pebbles move in plug flow, without shear. In the converging section 94 at the top of the core, the pebbles converge into an annular slot 51 that is 4 to 10 pebbles across, and this slot then converges above into 1 to 4 defueling chutes (not shown) with the transition designed to prevent pebble bridging, then leading to defueling channels (not shown), and then leading to defueling machines (not shown). In the converging region of the bed additional shearing occurs, causing additional radial pebble dispersion, but this has little effect on the core neutronics because the pebbles are then advected out of the core. Because the outside radius $r_o$ of the core converges while the inside radius $r_i$ remains constant or increases slightly, the thickness occupied by the fuel drops rapidly entering the defueling slot 51 (because with plug flow the area occupied by the blanket pebbles and the driver pebbles must remain constant). This causes the core to be subcritical in the outlet slot 51 region. The length of the slot 51 and the defueling chutes are preferably configured to allow the pebbles to have 1 to 4 days residence time under subcritical conditions to allow fission product decay heat generation to drop before removal.

The converging and diverging sections 94, 90 of the annular pebble bed core create a core geometry that approaches spherical symmetry, which is valuable for neutronics. However, the breeding blankets do thin down at the top and bottom of the core, in the region of the diverging and converging sections. The optimal angle for divergence and convergence will cause the local reactivity of the driver pebbles to drop sufficiently that the local thinning of the breeding blanket is compensated by reduction of the local neutron flux, so that the dose to the reflector graphite remains uniform in the diverging and converging sections. Optimal design may be acquired through neutronics analysis.

Benefits of the axially and radially zoned pebble core 10 of the present invention includes (1) using movable pebbles and an outer radial reflector to reduce doses to the reactor vessel, (2) using transverse flow of coolant across the pebble bed to reduce pressure drop and pumping power greatly, and (3) reducing neutron dose rate to partitions in the area where pebble injection occurs.

Currently, the molten salt reactor (MSR) can achieve the best thermal-spectrum neutron economy of any known reactor design. However, because the MSR uses a fluid fuel its development involves other substantive problems compared to solid-fuel reactors such as the PB-AHTR.

The annular PB-AHTR 10 of the present invention can manage a wider variety of potential fuel cycles while operating with thorium as a fertile material. A key performance parameter to assess the flexibility of PB-AHTR fuel cycles is the maximum conversion ratio (CR) for the annular PB-AHTR operated under an equilibrium thorium fuel cycle. Thus, it is desirable to maximize the PB-AHTR equilibrium thorium-cycle CR, as well as other performance parameters.

A simplified model useful in parametric studies for CR is illustrated in cylindrically symmetric, simplified 3-D representation of core 80 of FIG. 3, which treats neutron leakage from the top and bottom using an assumed neutron leakage fraction. The 30° section is taken through the mid elevation, or constant area section of the core. The pebbles in the core can be modeled using a stacked hexagonal lattice, filling the annular blanket and driver fuel regions shown below, without affecting the accuracy of neutronic predictions significantly. Pebbles lying at boundaries can also be cut off at the boundary. An initial set of dimensions for a 900-MWth core may be as follows: inner radius $r_i$=0.90 m, inner blanket (thorium or graphite) 16 thickness $T_{IB}$=0.30 m, driver fuel 18 thickness $T_{df}$=0.90 m, outer blanket thickness (thorium) $T_{OB}$=0.30 m and overall core radius of $r_c$=2.90 m. It is appreciated that the power and these dimensions may be varied and optimized.

FIG. 3 also illustrates one of several potential geometries for azimuthal zoning of seed 72 and blanket 74 pebbles. The configuration shown allows for uniform heating of coolant flowing radially outward through the blanket. The average power density in the driver fuel region should be 30 MW/m$^3$ (corrected for fission energy also generated by subcritical multiplication in the fertile blanket). The outer edge of core 80 comprises boron-carbide rods to absorb thermalized neutrons.

In addition to having fertile thorium pebbles in the blanket, it is also desirable to have axial zoning with blanket pebble layers alternating with the seed pebble layers in the driver region. At the limit of very small axial zone thickness, the seed and blanket pebbles may be effectively and randomly mixed. These blanket pebbles will be easily separated from the seed pebbles, so that they can have decay storage (like the radial blanket pebbles).

In addition, at the center of the inner radial reflector, 14 it may be valuable to have a separate channel 12 that can be filled, and emptied, with seed pebbles or thorium blanket pebbles. Absorption of neutrons by seed pebbles provides a method to increase reactivity, while absorption by blanket pebbles provides a method to reduce reactivity. Removing or adding pebbles to this channel may thus allow reactivity control for slowly-evolving reactivity transients, including those associated with xenon buildup following power reduction. By using seed or blanket pebbles to control reactivity, the parasitic neutron absorption by control rods (e.g., boron) can be reduced further and the reactor conversion ratio increased.

The 30° C. sector model of FIG. 3 also allows the reactivity worth of the 6 (or 12 or more) shutdown rods to be modeled, by placing boron in the shutdown channel 66 and determining the change in keff. The model can also evaluate the reactivity worth of adding, or removing, thorium blanket pebbles from a central channel in the inner reflector.

In all cases, the driver pebble carbon to heavy metal ratio (C/HM) is ideally adjusted to provide a slightly under-moderated system with negative coolant temperature feedback.

There are several parameters that contribute to the maximum conversion ratio:

1) Ratio of carbon-to-heavy-metal (C/HM) for seed pebble heavy metal in the driver fuel region 18. This ratio is adjusted to obtain a negative coolant temperature coefficient. To obtain the correct seed-pebble HM inventory, it will be necessary to vary the particle kernel diameter (nominally 300 micron), particle packing fraction, and diameter of the pebbles' inner graphite kernel. The density of the inner graphite kernel is adjusted to give an average pebble density of approximately 1.72 g/cc. The minimum density for the center kernel graphite is 0.25 g/cc.

2) Mass of thorium in each blanket pebble. To obtain different thorium loading, the particle kernel diameter (nominally 600 micron), particle packing fraction, and diameter of the pebble's inner graphite kernel, as with seed pebbles.

3) Mixing ratio of blanket and seed pebbles in the driver fuel region. Reasonable values to explore include 0/100, 5/100, 10/100, 20/100, and 40/100. Adding blanket pebbles into the driver fuel region will require increasing the heavy metal loading in the seed pebbles to maintain the correct C/HM ratio for negative coolant temperature feedback.

4) Mixing ratio of blanket and inert graphite pebbles in the inner blanket region.

5) Pebble residence time in core (7 to 30 days) and blanket pebble storage time outside the core (1.5 to 5 times the blanket pebble residence time). Blanket pebbles in the driver fuel region will receive a higher total fluence and will have a larger Pa-233 inventory upon discharge than blanket pebbles in the blanket regions. There may be benefits to swapping blanket pebbles between these regions, so that after a driver region pebble undergoes decay storage it then goes to the lower-flux region of the blanket, where less of the residual Pa-233 is destroyed.

6) Radial and axial dimensions of the blanket and driver fuel regions. Various combinations may be used.

There are several performance metrics for comparing the different parametric variations:

1) Conversion ratio (CR): The rates at which seed and blanket pebbles are discharged are determined by the total inventories of each, and the time required for them to reach full discharge burn up. Each discharged seed and blanket pebble must be replaced by a new pebble. The discharged blanket and seed pebbles may be co-reprocessed, and the separated uranium (U-232, U-233, U-234, U-235, and U-236) refabricated back into new seed pebbles. To obtain the design C/HM ratio for the core either make-up U-233 is added to each pebble (CR<1), or some of the discharged uranium is placed in storage (CR>1). Thorium is separated and stored for decay prior to refabrication into new blanket pebbles. Np-237 and other transuranics may not be recycled (for this case of determining the maximum CR). In an actual annular PB-AHTR, these transuranics could be fabricated into separate deep-burn pebbles for transmutation.

2) Seed and blanket pebble lifetime: The amount of time required for a seed or blanket pebble to reach full discharge burn-up is an important parameter that affects how rapidly fuel qualification testing can occur. This is particularly important for seed pebbles. The design goal for the start-up core is to have pebbles reach full discharge burn up in under one year.

3) Neutron dose to solid reflectors: Neutron dose rate (>100 keV) to the inner and outer solid graphite reflectors is a major parameter affecting their life expectancy. In particular, it is desirable for the outer reflector to have a long life expectancy (60 to 100 years) if possible.

4) Shutdown rod reactivity worth: The annular PB-AHTR will have 4 to 24 shutdown rod channels. Reactivity worth for these rods is an important performance parameter that will affect the design of the inner blanket pebble region (potentially requiring that the pebbles be inert graphite). The requirement for sufficient shutdown rod reactivity worth may also affect the capability to shield the inner solid reflector sufficiently to provide very long life.

5) Reprocessing rate for seed and blanket pebbles: If reprocessing is used, it is desired to minimize the rate and volume of pebbles being reprocessed, to reduce reprocessing costs and to minimize the quantity of irradiated pebble graphite that must be recycled or discarded. Obviously the rate of reprocessing can be reduced by increasing the burn up level for seed and blanket pebbles. This comes with a penalty on the achievable conversion ratio. For blanket pebbles, high burn up levels may also require very long pebble residence times, which affects the difficulty of blanket pebble irradiation testing and which may prolong the start-up phase for PB-AHTR power plants.

6) Peak particle power (mW/particle): Current design limit is 300 mW/particle. This must be achieved while meeting particle packing density limits (typically maximum of 40%). This may also provide the basis to change the core average power density (current baseline is 30 MW/m$^3$)

7) U-232 concentration in blanket and seed uranium: Higher concentrations of U-232 make the recycled U-233 less attractive for use in nuclear explosives because daughters of U-232 emit strong gamma radiation. Because the PB-AHTR does not have any separation of Pa-233, it will have higher U-232 concentrations in the recycled U-233.

For the purpose of identifying the maximum conversion ratio, the first performance metric is generally most important. But the other 6 performance metrics also play a role.

Figure 4:
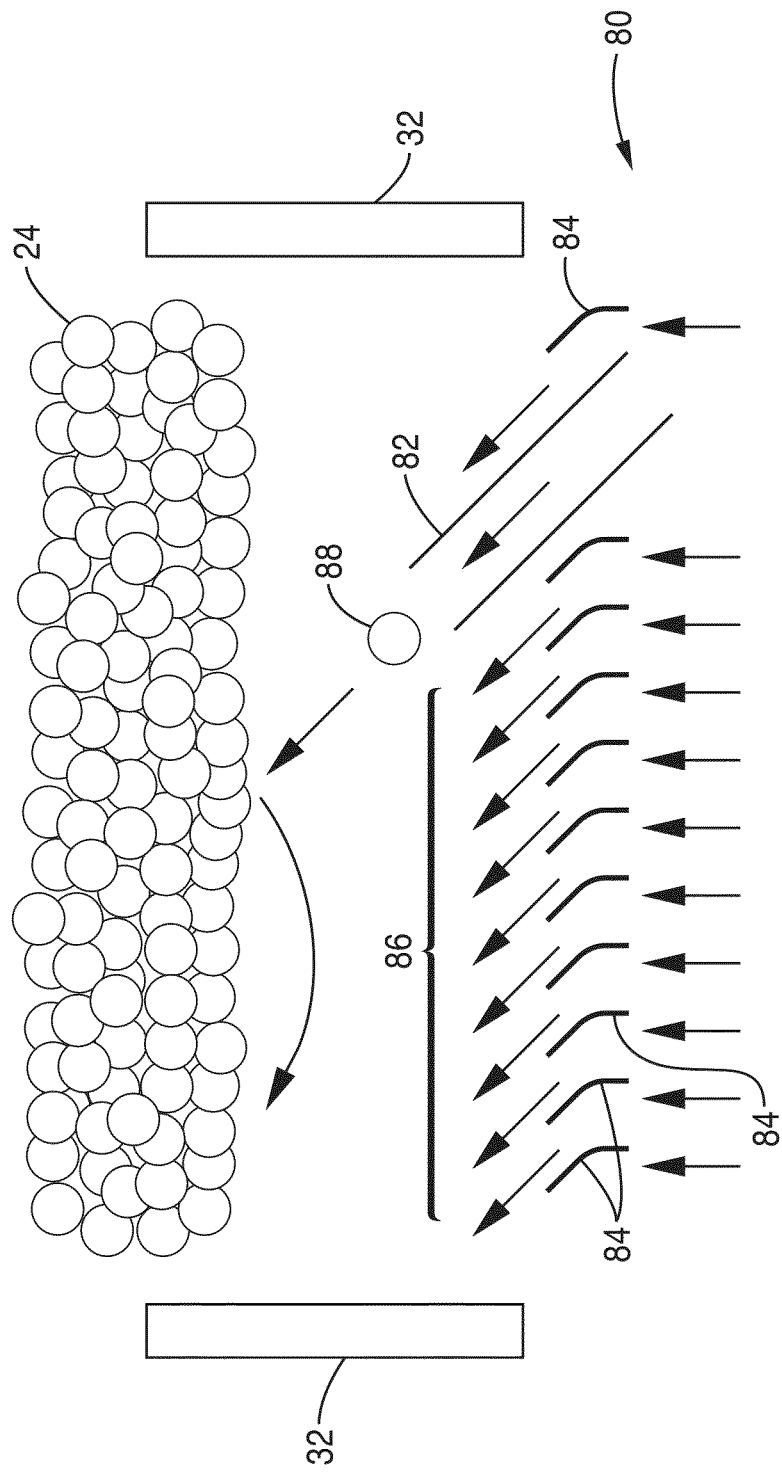
FIG. 4 is a schematic diagram of a pebble injection device using swirl flow to flatten pebble bed surface in accordance with the present invention.

FIG. 4 illustrates pebble injection device 80 using swirl flow to flatten pebble bed surface by injecting pebbles into the bottom of the reactor core at inlet 62 between annular dividers 32. Coolant 38 is directed into vanes 84 to generate a swirling coolant flow 86 in the annulus. This causes pebbles 88 injected via tube 82 to bounce and move horizontally upon landing into the pebble bed 24, to develop a relatively flat surface on the bottom of the bed, and thus more uniform axial zoning In an alternative embodiment, the pebbles injected into the bottom 44 of the core 24 are injected into multiple hoppers (not shown), which distribute the pebbles into the annular rings 32 at the bottom 44 of the core and into pebble injection annulus 61.

The baseline fuel cycle for the annular PB-AHTR 10 of the present invention is a once-through, seed-blanket fuel cycle. For this configuration, the seed pebbles provide the additional fissile material needed to sustain criticality, and use either low enriched uranium (LEU) fuel, or deep-burn (plutonium or transuranics without fertile material) fuel. Because the blanket pebbles are not recycled, they may use thorium mixed with sufficient depleted, natural or LEU uranium to denature the bred U-233 to be low enriched. The denaturing makes the blanket pebbles unattractive targets for theft or diversion. The disadvantage of adding U-238, related to the build up of higher actinides which are more challenging to recycle (particularly curium), is not as important because the blanket pebbles are not intended to be recycled.

Optimally, the driver fuel region 18 may comprise three radial zones as well as multiple axial zones, with seed pebbles being cycled first through the outer radial driver zone, second through the inner radial driver zone, and finally through the middle radial driver zone prior to discharge as spent fuel.

The blanket operation may involve the use of an outer blanket 20 with two zones and an inner blanket 16 with one zone. The inner blanket 16 should provide sufficient moderation of neutrons to reduce the fast neutron flux to the inner solid radial reflector, but also allow sufficient thermal neutrons to reach the reflector 14 for the shutdown rods in the reflector to have adequate reactivity worth. Blanket pebbles will then be cycled through these three zones, and then into the driver region in alternating layers with seed pebbles zone to receive a higher neutron fluence and fission the bred U-233. Some external Pa-233 decay storage time is provided for the blanket pebbles to increase the yield of U-233.

Several parameters may be varied for optimal once-through seed-blanket design. The maximum achievable burn-up for LEU and deep-burn seed pebbles can be calculated, as well as the number of days required to reach this discharge burn up level. Criteria for the maximum burn up of blanket pebbles, prior to discard as waste, may also be calculated. The optimal thickness of the blanket and seed pebble regions, and thickness of axial layers of seed and blanket pebbles 22, 24 in the driver fuel region 18, may be determined to meet criteria for reduction of neutron dose to the inner and outer solid radial reflectors, shut-down and control rod reactivity worth, minimization of the reactor vessel radius and height, and pressure loss across the reactor core 10. It is anticipated that the optimal core dimensions may be the same as those for the closed thorium fuel cycle option shown below in FIG. 5, so that PB-AHTR's can be used for both once-through and closed thorium fuel cycles.

Figure 5:
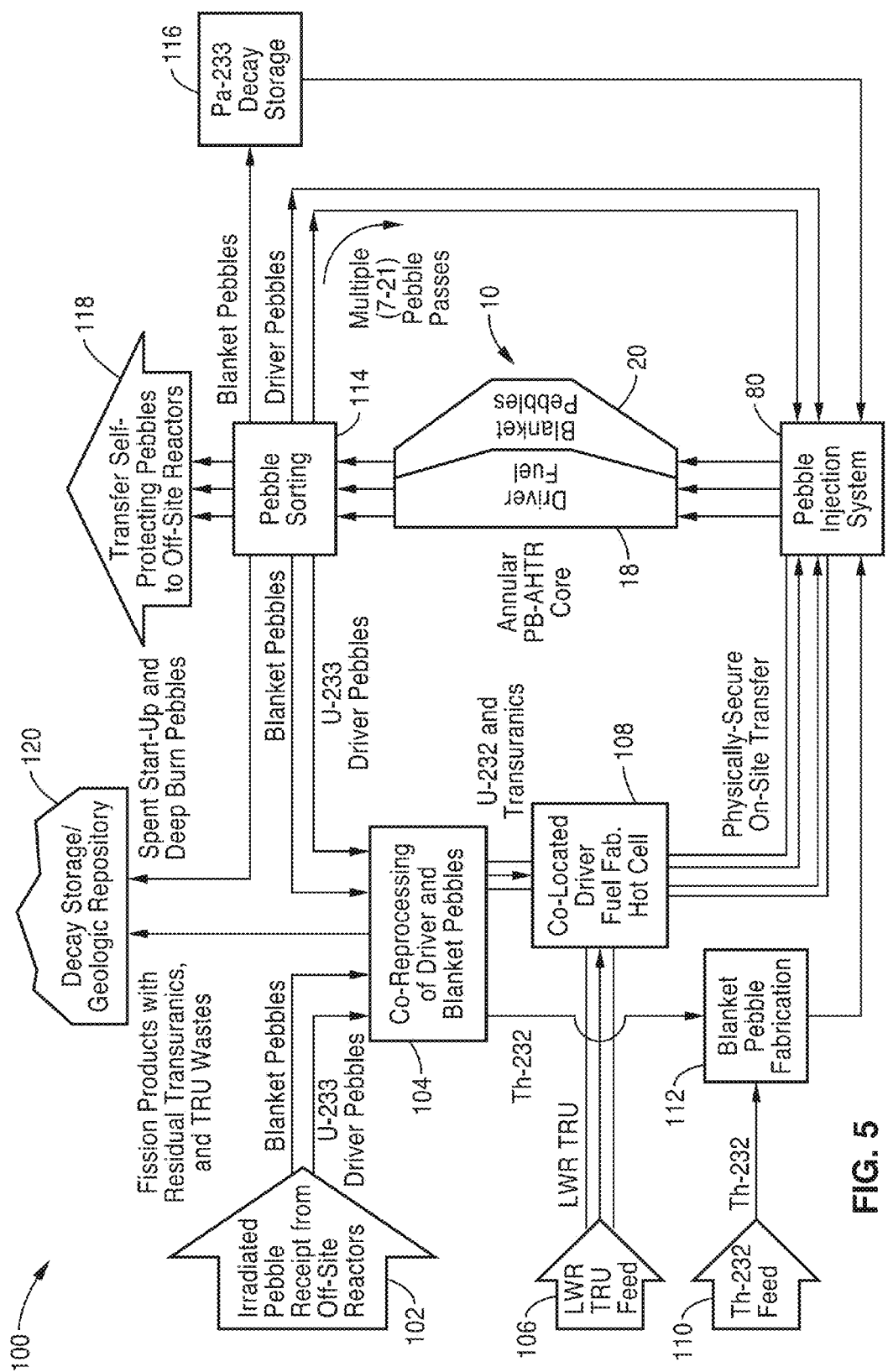
FIG. 5 illustrates a schematic diagram of a thorium based PB-AHTR closed fuel cycle.

FIG. 5 illustrates a schematic diagram of a thorium based PB-AHTR closed fuel cycle 100 that would also provide the capacity to start up new PB-AHTR reactors, and to provide transmutation services to destroy transuranic waste materials recovered from LWR spent fuel. With its potential capability to support blankets, the annular PB-AHTR 10 of the present invention is a candidate to operate with a closed thorium fuel cycle.

As shown in FIG. 5, irradiated pebbles (blanket pebbles and U-233 driver pebbles) are received from off-site reactors at 102. Co-reprocessing of fuel and blanket pebbles is then performed at 104 to separate waste/fission products (which are sent to decay storage/geological repository 120) to generate pure Th-232 and U233/transuranics. Remote (hot cell) fabrication of new driver pebbles (U233/transuranics) via light water reactor feed 106 is performed at 108. Remote fabrication is desired due to gamma radiation from U-232 in the driver fuel, which is present in substantial concentrations (no Pa-233 chemical separation occurs in this reactor design). Blanket pebble fabrication is performed via Th-232 feed 110 at 112. The pebbles generated at steps 108 and 112 are then input into core 10 via pebble injection system 80 (e.g. as shown in FIG. 4.)

Pebbles output from the core 10 are sorted at 114. Pebbles may be sorted by measuring the mass of the pebbles, along with radiation (cesium 137) to determine pebble burn-up. Pa-233 of the thorium blanket pebbles may also be measured to determine the length of decay storage at 116 for blanket pebbles prior to being recycled back into pebble injection system 80.

A portion of the pebbles sorted at 114 (e.g. pebbles undergoing one-pass) may be used to feed additional offsite reactors at 118.

Driver pebbles (U-233) and LWR not fully discharged may be recycled into pebble injection system 80 for multiple passes (e.g. 7 to 21), until the pebbles are fully discharged.

Fully discharged driver and blanket pebbles may be sorted at step 114 for co-reprocessing at step 104. Spent startup and deep-burn pebbles are sorted to decay storage at 120.

TRISO fuel reprocessing and fabrication technologies are now being developed under the DOE Deep Burn Fuel program. The thorium will also contain Th-228 with a 1.9-year half life. Decay storage 116 may be justified for the thorium to allow direct-contact handling for the refabrication of new blanket pebbles.

As with the mixture of plutonium and minor actinides that is recycled in the integral fast reactor (IFR), in the closed fuel cycle 100 for the annular PB-AHTR, the U-233, other uranium isotopes, Np-237, and higher actinides that are recovered by reprocessing would be weapons usable. Therefore, as with the IFR, all transfers of fresh driver pebbles occur under remote handling conditions in hot cells or in shielded transfer casks in underground transfer tunnels, providing substantial passive barriers to theft. Driver pebbles destined for use in off-site reactors 118 receive 1 to 3 passes through an on-site reactor before transport, so that all pebbles transported in a PB-AHTR thorium fuel cycle are self-protecting. Both spent and fresh pebbles are transported in the same heavily shielded transport casks. The capability to partially irradiate fresh pebbles is a physical security benefit provided by the on-line refueling capability of the PB-AHTR.

Additional thorium fuel cycle options for the annular PB-AHTR 10 may be used to provide core and blanket design parameters that optimize the conversion ratio under an equilibrium thorium fuel cycle.

The annular PB-AHTR core 10 of the present invention comprises a substantial number of radial and axial or azimuthal pebble zones, with a quasi-spherical geometry, having significant implications for thorium-based fuel cycles using LEU, TRU and U-233 as driver fuel. The potential for 3 to 6 radial zones, and a large number of axial or azimuthal zones in the core, provides significant flexibility to flatten the radial power distribution, optimize fast-neutron shielding of the inner and outer radial reflectors, and maximize the efficient use of neutrons. The addition and removal of seed or thorium blanket pebbles to a central control channel in the inner reflector provides a method to control reactivity changes due to xenon following power level changes while minimizing parasitic neutron losses.

Solid-fueled liquid-salt reactors have much simpler materials issues than liquid-fueled MSR reactors. Therefore the potential for an annular PB-ATHR design to achieve high levels of TRU waste destruction and sustainable use of thorium, as provided in the system of the present invention may have significant implications on the efficacy of PB-ATHR systems.

In a radially-zoned core, it is valuable to have the pebbles flow up into an expanded region 90 of the core, so that the injection area 62 can be made subcritical to reduce neutron fluences to partition hardware. In the expansion region 90 the pebbles may separate from the solid graphite reflector 14, 26 that forms the channel, particularly due to the hydrodynamic forces of coolant flowing through the bed. Such separation of the pebble bed 64 from the reflector would have negative implications for safety and reliability.

Figure 6:
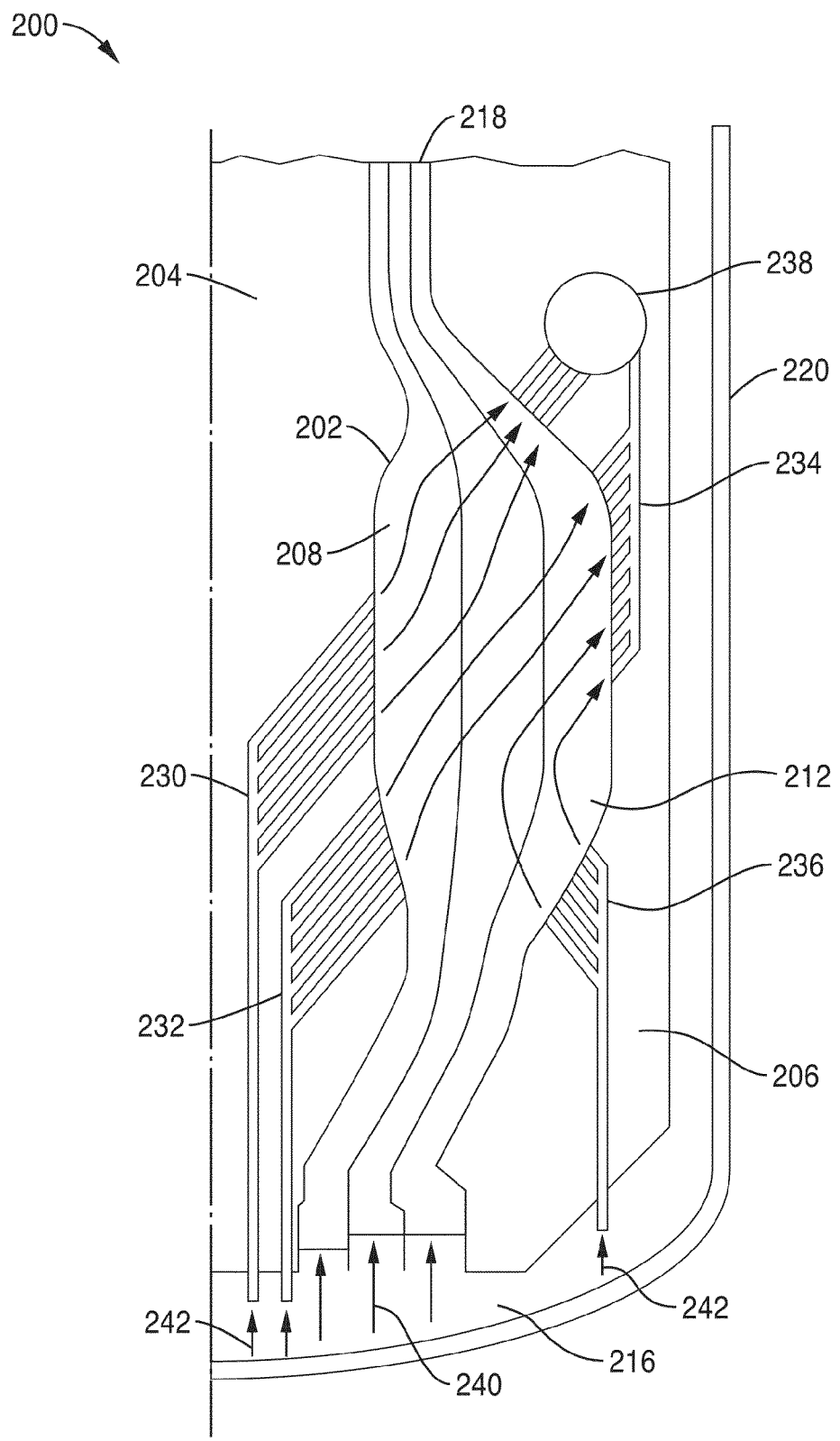
FIG. 6 illustrates a radially zoned PB-AHTR core configured to allow variation of the coolant flow pattern directed into pebble bed.

In general, in an annular core it is desirable to have a substantial radial flow component to reduce the total pressure drop for coolant flow across the core. FIG. 6 illustrates a core 200 having coolant flow 240 directed into pebble bed inlet 216 in addition to coolant 242 directed into the inner reflector 204 via injection ports 232 in the diverging region of the pebble core 202 and via injection ports 230 in the constant area region of the pebble core 202. Coolant flow 242 is also directed into the diverging region of the pebble core through injection ports 236 in the outer reflector 206. The upper converging and constant area section of the pebble core 202 may also have a plurality of ports 234 for evacuation of coolant from the pebble core 202 and into the output plenum 238.

The core 200 shown in FIG. 6 comprises three radial zones (inner zone 208, middle zone 210, and outer zone 212. However, it is appreciated that any number of radial zones may be used, in addition to axial and azimuthal zoning.

When coolant flow is introduced into channels 230, 232, and 240 and removed from channel 234, a combination of radial and axial flow can be established. However, the injection flow from ports 232 into the expansion region could cause the pebbles moving up into the core 202 to separate from the center radial reflector 204, generating a void.

System 200 may be configured to perform time-varying changes in injection flow to agitate the pebble bed 202 and thus cause it to remain attached to the channel walls. Several approaches to vary the injection flow may be used to achieve this goal. One specific embodiment to agitate the pebble bed 202 involves an additional injection ports 236 located in the outside reflector 206 of the expansion region of the pebble core 202. Here injection flow could be periodically switched from ports 232 to 236 and back again to agitate the bed 202. The advantage of switching the flow between two injection points is that the total coolant flow rate can be kept constant.

Preconceptual Design Description for a 16 MWth Fluoride Cooled High Temperature Reactor (FHR-16)

Figure 7:
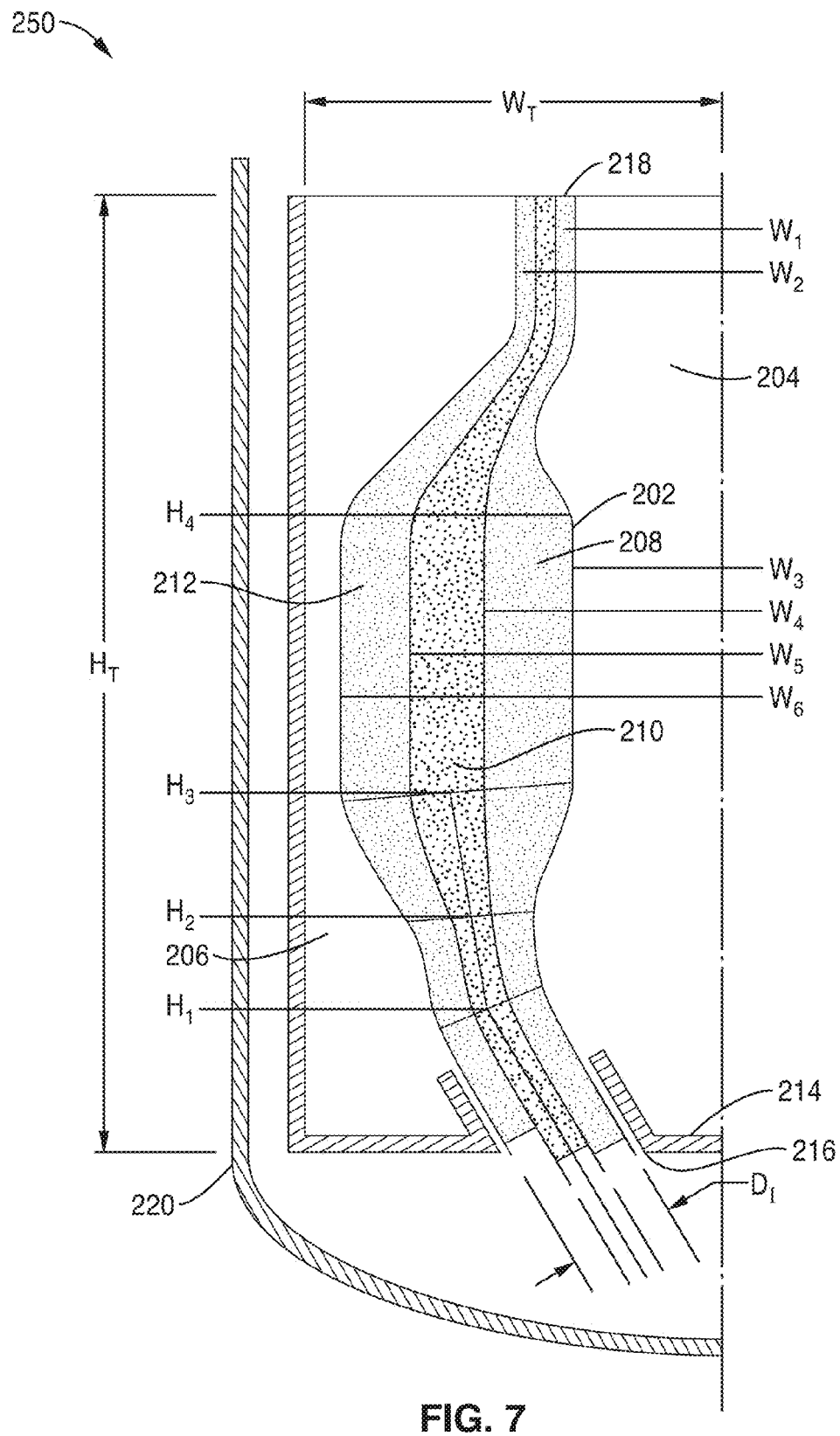
FIG. 7 illustrates a core design 250 for a 16-MWth test reactor

FIG. 7 illustrates a core design 250 for a 16-MWth test reactor, herein called the Fluoride Cooled High Temperature Reactor or FHR-16. The reactor vessel has a height $H_T$ of approximately 5 m (16.4 ft) and outside diameter of 2.7 m (8.9 ft). The FHR-16 shares many design features with the 900-MWth annular Pebble Bed Advanced High Temperature Reactor (PB-AHTR) shown in FIG. 1 and described above.

The FHR-16 core 250 would be intended to demonstrate the major features of the AHTR reactor class. The annular core 202 has an effective height of 1.0 m, and uses 3.0-cm diameter driver, blanket and shielding pebbles. Exemplary dimensions include $W_1$=400, $W_2$=560, $W_3$=400, $W_4$=650, $W_5$=860, $W_6$=1040, $W_f$=1350, $H_1$=430, $H_2$=670, $H_3$=990, $H_4$=1770 (all in mm).

Due to the small size of the FHR-16 core 250, it is only configured with three radial zones (208, 210, 212) and the radial divider partitions (not shown) that control the radial landing location of pebbles on the bottom of the core are spaced approximately 10 cm apart, or 3.3 pebble diameters. A dry PREX-3 experiment, shown in FIG. 9, was constructed to verify radial zone generation for the FHR-16 core 250.

The driver fuel region 210 operates with an average power density of 20 MW/m$^3$ and has an effective volume of 0.8 m$^3$. The driver fuel region 210 is surrounded by a radial pebble blanket with an effective volume of 1.0 m$^3$, shown in green. Finally, the blanket is surrounded by a shielding pebble region, shown in gray, designed to reduce the neutron flux to the outer radial reflector to low levels. In the driver region the average power of the 34,000 pebbles is 740 W. Including pebbles in the subcritical pebble injection region below the core, and defueling slot above the core, the total number of driver pebbles in the core is approximately 42,000, while the core contains approximately 55,000 blanket pebbles and 94,000 shielding pebbles (alternatively, the shielding pebbles could be replaced by solid graphite reflector material).

Neutronics calculations assume that the driver pebbles contain low-enriched uranium (LEU), while the blanket and shielding pebbles are inert graphite. Neutronics calculations may also be performed to determine the initial heavy-metal loading and fuel enrichment required to achieve startup with keff=1.01 (to account for control rod worth for xenon control) and slightly negative coolant void reactivity. Subsequent calculations may be performed on higher-enrichment levels and heavy metal loading to obtain equilibrium core operation, and examine the use of thorium blanket pebbles with LEU, LWR-TRU, excess W-Pu, and U-233 in seed pebbles. Several figures of merit for performance may be qualified, including dose to solid reflector structures and shutdown rod worth.

It should be noted that several features, including coolant flow paths, core support structures, and structures in the top portion of the vessel, are not shown in FIG. 7. The FHR-16 core 250 will likely use substantially more salt per MW than in a full-scale PB-AHTR, to avoid the need for a buffer salt to fill the annulus with the guard vessel. If one assumes about 2 m effective depth of flibe in the vessel (the rest being filled with graphite), then the volume of salt needed would be 2*3.14*1.2$^2$=9 m$^3$ or 18 tons.

The FHR-16 core 250 has a relatively small increment in power level compared to the MSRE. Fuel qualification should be possible on a compressed time scale, as long as the start up fuel is designed to have relatively conservative (by PB-AHTR standards) peak particle power. Also for primary loop structural materials the baseline design will use Alloy 800H clad with Hastelloy N (since Alloy 800H has better structural properties), but the IHX tubes may need to be pure Hastelloy N which means that some work needs to be done on the Hastelloy N ASME code case to get the temperature up to 750° C. for transients.

The FHR-16 core 250 will be capable of producing electricity, and can be coupled to a multiple-reheat nitrogen Brayton cycle or a supercritical $CO_2$ cycle. While the power conversion system provides some technical risk, it is useful to note that the FHR-16's power level is in the range where extensive experience exists with air-Brayton turbomachinery.

EXAMPLE

Figure 8:
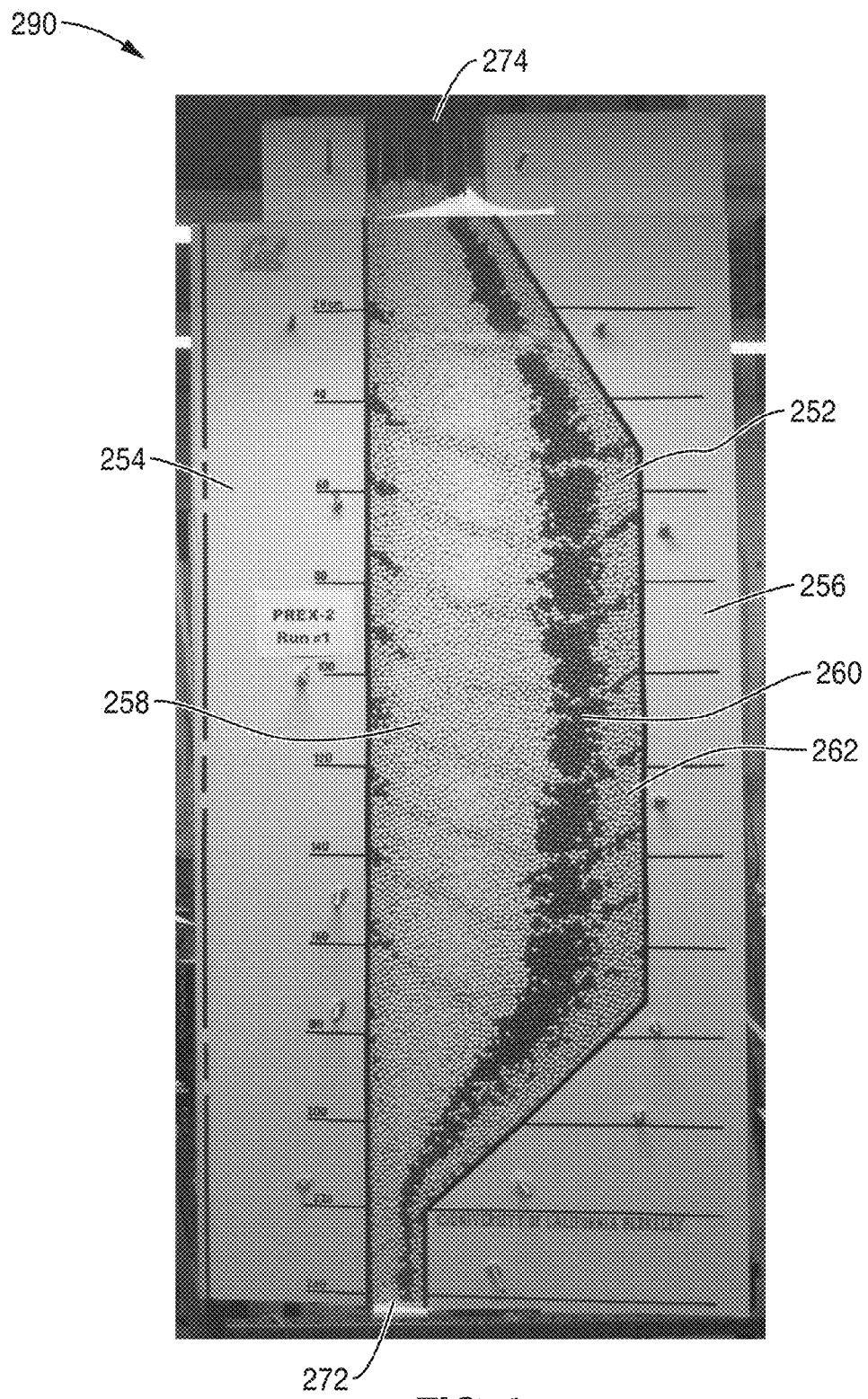
FIG. 8 illustrates an experimental setup simulating the radial and axial zoned core 10 of FIG. 1.
Figure 9:
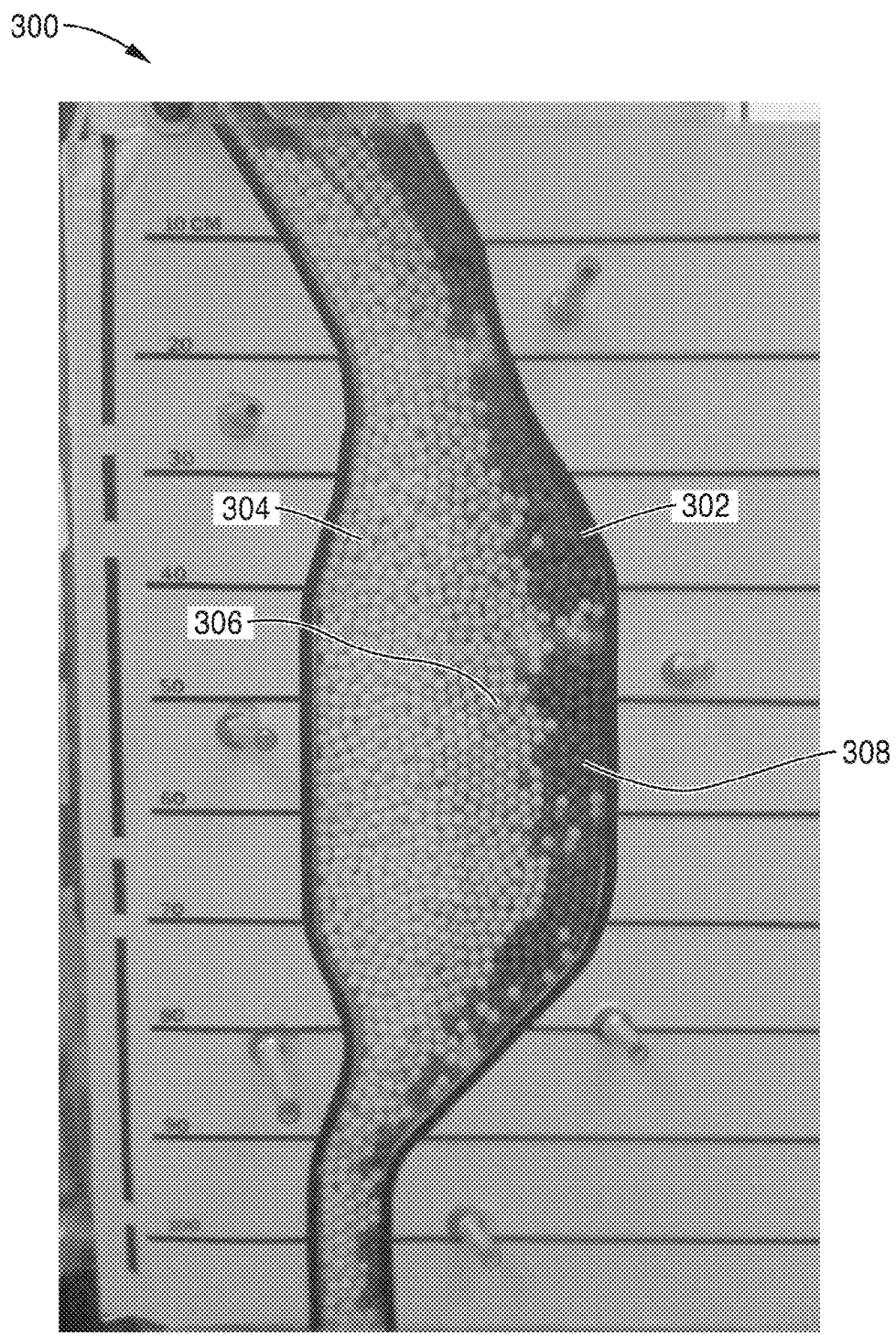
FIG. 9 illustrates an experimental setup simulating the radial zoned core of FIG. 7.

FIG. 8 illustrates a first experimental setup 290 simulating the radial and axial zone core 10 of FIG. 1 Specifically, FIG. 8 shows a scaled experiment reproducing a 15° sector of a 900-MWth annular pebble core, demonstrating the generation of radial and axial zoning in the core. The experiment contains a total of 130,000 high-density polyethylene (HDPE) pebbles each 1.25 cm in diameter FIG. 9 illustrates an experimental setup simulating the radial zoned core of FIG. 7. The PREX-3 experiment demonstrates the generation of radial zoning for the 42% geometric scaled, 30° sector of the FHR-16 core, under dry conditions.

The setup 290 included walls 254, 256 simulating inner and outer reflectors, respectively. For fuel testing one can add small numbers of test pebbles (differentiated by having a slightly different weight to allow easy sorting) into the FHR-16, providing a test capability. The design may include provisions to uprate power to 20 MWth, which would raise the average power density to 25 $MW/m^3$, closer to the prototypical 30 $MW/m^3$ currently envisioned for the PB-AHTR.

Flow injection into the annular core occurs in multiple locations via divider 274 (showing 6 radial zones). Periodic oscillation of flow between C and D can agitate bed to keep it packed to full theoretical density.

From the discussion above it will be appreciated that the invention can be embodied in various ways, including the following:

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. A liquid fluoride salt cooled, high temperature reactor, comprising: a reactor vessel; a pebble-bed reactor core contained in the reactor vessel; wherein the reactor core comprises a pebble injection inlet located at a bottom end of the reactor core and a pebble defueling outlet located at a top end of the reactor core; said reactor core cooled by a liquid fluoride salt coolant; said reactor core comprising an inner reflector, outer reflector, and an annular pebble-bed region comprising an annular channel disposed in between the inner reflector and outer reflector; said annular channel configured for receiving pebble fuel comprising a combination of seed and blanket pebbles having a density lower than the coolant such that the pebbles have positive buoyancy and migrate upward in said annular pebble-bed region toward the defueling outlet; said annular pebble-bed region comprising a pebble injection annulus extending from the pebble injection inlet, the pebble injection annulus leading into a diverging conical region at the bottom end of the reactor core, and converging conical region leading into a pebble defueling slot at the top end of the reactor core; and wherein the annular pebble-bed region comprises alternating radial layers of seed pebbles and blanket pebbles.

2. A reactor as recited in embodiment 1, wherein the annular pebble bed region comprises a driver fuel layer disposed between an inner radial blanket pebble layer and outer radial pebble blanket layer; the inner radial blanket pebble layer being adjacent the inner reflector, and outer radial pebble blanket layer being adjacent the outer reflector.

3. A reactor as recited in embodiment 2, wherein the driver fuel layer comprises a plurality of axial layers comprising alternating seed and blanket pebble zones; the alternating seed and blanket pebble zones configured to allow reduced power peaking.

4. A reactor as recited in embodiment 3, wherein the blanket pebbles comprise graphite blanket pebbles or thorium-bearing blanket pebbles containing coated particles of thorium.

5. A reactor as recited in embodiment 4, wherein the blanket pebbles comprise a mixture of thorium and uranium.

6. A reactor as recited in embodiment 4, wherein the seed pebbles comprise coated particles containing fissile uranium or plutonium fuel.

7. A reactor as recited in embodiment 6, wherein the seed pebbles comprise recycled U-233, plutonium, or a mixture of plutonium and other transuranics.

8. A reactor as recited in embodiment 2, further comprising: a plurality of partition rings disposed at the pebble injection inlet; wherein the partition rings control the radial location for pebbles injected into the annular pebble-bed region to generate the alternating radial layers of seed pebbles and blanket pebbles.

9. A reactor as recited in embodiment 2, further comprising: a plurality of dividers disposed at the pebble injection inlet; wherein the dividers control the azimuthal location for pebbles injected into the annular pebble-bed region to generate alternating azimuthal layers of seed pebbles and blanket pebbles.

10. A reactor as recited in embodiment 8, wherein the partition rings comprise an outer partition ring that delineates the outer radial blanket pebble layer from the driver fuel layer provide shielding of the outer reflector from neutrons generated by fission in seed pebbles, and an inner partition ring that delineates the inner radial blanket-pebble zone from the driver fuel layer to provide shielding of the inner reflector from neutrons generated by fission in seed pebbles.

11. A reactor as recited in embodiment 1, wherein the pebble injection annulus and the pebble defueling slot are configured to be substantially subcritical.

12. A reactor as recited in embodiment 1: wherein inner reflector comprises an inlet plenum leading to a plurality of inner injection ports in the bottom end of the pebble bed region; wherein coolant from the inlet plenum is injected into the annular pebble bed region via the plurality of inner injection ports; wherein the outer reflector comprises a plurality of outlet ports in the top end of the pebble bed region, the outlet ports leading to an outlet plenum; wherein the pebble bed region is configured such that the coolant exits the pebble bed region primarily into the outlet ports in the outer reflector; wherein the location of the coolant injection and outlet ports is selected to generate a radially outward and upward flow of coolant through the pebble bed region.

13. A reactor as recited in embodiment 12, wherein the angle of the coolant flow reaching the outer reflector is configured such that a transverse hydrodynamic force on the pebbles is capable of overcoming friction between the pebbles and outer reflector.

14. A reactor as recited in embodiment 12: wherein the outer reflector further comprises a plurality of outer injection ports leading into the bottom end of the pebble bed region; wherein the reactor is configured such that coolant may be injected into the lower portion of the annular pebble bed core from the outer injection ports of the outer reflector and oscillated periodically between the outer injection ports and inner injection ports to agitate the pebble bed.

15. A reactor as recited in embodiment 1: wherein the inner reflector has a control channel at its center; wherein the control channel is configured such that pebbles may be injected at a bottom inlet of the control channel, and defueled from a top outlet of the control channel; and wherein reactivity of the reactor may be controlled by varying the rate of injection and defueling of pebbles into the control channel to vary the inventory of pebbles in the channel.

16. A reactor as recited in embodiment 1, further comprising: a pebble injector at the pebble bed inlet; the pebble injector comprising a plurality of entrance vanes; wherein the coolant flow entering the bottom of the fuel injection annulus is swirled by the entrance vanes; and wherein the swirling flow in the annulus alters a deposition pattern of injected pebbles at a bottom of the pebble bed.

17. A reactor as recited in embodiment 1: wherein the defueling slot is configured with sufficient volume to permit sufficient residence time for decay of short-lived fission products prior to removal from the core.

18. A reactor as recited in embodiment 3: wherein the outer radial layer blanket pebbles is made sufficiently thick and of a composition to provide effective neutron shielding for a metallic outer reflector structure.

19. A liquid fluoride salt cooled, high temperature reactor, comprising: a reactor vessel; a pebble-bed reactor core contained in the reactor vessel; wherein the reactor core comprises a pebble injection inlet located at a bottom end of the reactor core and a pebble defueling outlet located at a top end of the reactor core; said reactor core cooled by a liquid fluoride salt coolant; said reactor core comprising an inner reflector, outer reflector, and an annular pebble-bed region comprising an annular channel disposed in between the inner reflector and outer reflector; said annular channel configured for receiving pebble fuel comprising a combination of seed and blanket pebbles having a density lower than the coolant such that the pebbles have positive buoyancy and migrate upward in said annular pebble-bed region toward the defueling outlet; said annular pebble-bed region comprising a pebble injection annulus extending from the pebble injection inlet, the pebble injection annulus leading into a diverging conical region at the bottom end of the reactor core, and converging conical region leading into a pebble defueling slot at the top end of the reactor core; wherein inner reflector comprises an inlet plenum; wherein coolant from the inlet plenum is injected into the annular pebble bed region via a plurality of inner injection ports in the bottom end of the pebble bed region; wherein the outer reflector comprises a plurality of outlet ports in the top end of the pebble bed region, the outlet ports leading to an outlet plenum; wherein the pebble bed region is configured such that the coolant exits the core primarily into the outlet ports in the outer reflector; and wherein the location of the coolant injection and outlet ports is selected to generate a radially outward and upward flow of coolant through the pebble bed region.

20. A reactor as recited in embodiment 19, wherein the angle of the coolant flow reaching the outer reflector is configured such that a transverse hydrodynamic force on the pebbles is capable of overcoming friction between the pebbles and outer reflector.

21. A reactor as recited in embodiment 19: wherein the outer reflector further comprises a plurality of outer injection ports leading into the bottom end of the pebble bed region; wherein the reactor is configured such that coolant may be injected into the lower portion of the annular pebble bed core from the outer injection ports of the outer reflector and oscillated periodically between the outer injection ports and inner injection ports to agitate the pebble bed.

22. A reactor as recited in embodiment 19; wherein the annular pebble bed region comprises a driver fuel layer of seed pebbles disposed between an inner and outer radial blanket pebble layers of blanket pebbles; the inner radial blanket pebble layer being adjacent the inner reflector, and outer radial pebble blanket layer being adjacent the outer reflector.

23. A reactor as recited in embodiment 22, wherein the driver fuel layer comprises a plurality of axial layers comprising alternating seed and blanket pebble zones; the alternating seed and blanket pebble zones configured to allow reduced power peaking.

24. A reactor as recited in embodiment 22, wherein the blanket pebbles comprise graphite blanket pebbles or thorium-bearing blanket pebbles containing coated particles of thorium.

25. A reactor as recited in embodiment 19, wherein the inner and outer reflectors comprise fenestrations for one or more of the following: shut-down rod, neutron flux measurement instrument, and reactivity control element.

26. A method for fueling a liquid fluoride salt cooled, high temperature reactor, comprising: providing a reactor vessel comprising; a pebble-bed reactor core contained in the reactor vessel; wherein the reactor core comprises a pebble injection inlet located at a bottom end of the reactor core and a pebble defueling outlet located at a top end of the reactor core; said reactor core cooled by a liquid fluoride salt coolant; said reactor core comprising a inner reflector, outer reflector, and an annular pebble-bed region comprising an annular channel disposed in between the inner reflector and outer reflector; said annular channel configured for receiving pebble fuel at the pebble injection inlet; said annular pebble-bed region comprising a pebble injection annulus extending from the pebble injection inlet, the pebble injection annulus leading into a diverging conical region at the bottom end of the reactor core, and converging conical region leading into a pebble defueling slot at the top end of the reactor core; and injecting the pebble fuel into the injection inlet; the pebble fuel comprising a combination of seed and blanket pebbles having a density lower than the coolant such that the pebbles have positive buoyancy and migrate upward in said annular pebble-bed region toward the pebble injection outlet; wherein the pebble fuel is injected into annular pebble-bed region as alternating layers of seed pebbles seeds and blanket pebbles.

27. A method as recited in embodiment 26, wherein the pebble fuel is injected into the annular pebble bed region in radial layers comprising a driver fuel layer of fissile seed pebbles disposed between inner and outer radial blanket pebble layer of blanket pebbles; the inner radial blanket pebble layer being adjacent the inner reflector, and outer radial pebble blanket layer being adjacent the outer reflector.

28. A method as recited in embodiment 27, wherein the driver fuel layer is sequentially injected with alternating layers of fissile seed pebbles and thorium-bearing blanket pebbles to create vertical axial zoning within the driver fuel layer.

29. A method as recited in embodiment 27, wherein the driver fuel layer is injected with alternating layers of fissile seed pebbles and thorium-bearing blanket pebbles to generate azimuthal zoning of seed and blanket pebbles.

30. A method as recited in embodiment 26, wherein the coolant is injected into the annular pebble bed region via a plurality of inner injection ports in the inner reflector; wherein the coolant exits the annular pebble bed region into one or more outlet ports in the outer reflector; wherein the location of the coolant injection and outlet ports generates a radially outward and upward flow of coolant through the pebble bed region.

31. A method as recited in embodiment 30, wherein the angle of the coolant flow reaching the outer reflector creates a transverse hydrodynamic force on the pebbles to overcome friction between the pebbles and outer reflector.

32. A method as recited in embodiment 30, wherein the outer reflector further comprises a plurality of outer injection ports leading into the bottom end of the pebble bed region; wherein coolant is injected into the lower portion of the annular pebble bed core from the outer injection ports and oscillated periodically between the outer injection ports and inner injection ports to agitate the pebble bed.

33. A reactor as recited in embodiment 26, further comprising: defueling the seed and pebble blanket pebbles from the defueling outlet; separating the seed pebbles from blanket pebbles; and storing thorium-bearing blanket pebbles in temporary decay storage to reduce neutron capture in Pa-233.

34. A method as recited in embodiment 33, further comprising: wherein the seed pebbles are re-injected into the injection inlet for one or more passes.

35. A method as recited in embodiment 34, wherein the seed pebbles are irradiated via a co-located reactor co-located; and wherein after one or more passes the seed pebbles have sufficiently high radiation levels to become self-protecting for theft.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A liquid fluoride salt cooled, high temperature reactor, comprising:
a pebble-bed reactor core configured for containment within a reactor vessel;
wherein the reactor core comprises a pebble injection inlet located at a bottom end of the reactor core and a pebble defueling outlet located at a top end of the reactor core;
said reactor core cooled by a liquid fluoride salt coolant;
said reactor core comprising an inner reflector, outer reflector, and an annular pebble-bed region comprising an annular channel disposed in between the inner reflector and outer reflector;
said annular channel configured for receiving pebble fuel comprising a combination of seed and blanket pebbles having a density lower than the coolant such that the pebbles have positive buoyancy and migrate upward in said annular pebble-bed region toward the defueling outlet;
said annular pebble-bed region comprising a pebble injection annulus extending from the pebble injection inlet, the pebble injection annulus leading into a diverging annular conical region at the bottom end of the reactor core, and converging annular conical region leading into a pebble defueling slot at the top end of the reactor core; and
wherein the annular pebble-bed region comprises alternating radial layers of seed pebbles and blanket pebbles
wherein inner reflector comprises an inlet plenum leading to a plurality of inner injection ports in the bottom end of the pebble bed region;
wherein the inlet plenum is configured to inject coolant into the annular pebble bed region via the plurality of inner injection ports;
wherein the outer reflector comprises a plurality of outlet ports in the top end of the pebble bed region, the outlet ports leading to an outlet plenum;

wherein the pebble bed region is configured such that the coolant exits the pebble bed region primarily into the outlet ports in the outer reflector;

wherein the location of the coolant injection and outlet ports is selected to generate a radially outward and upward flow of coolant through the pebble bed region.

2. A reactor as recited in claim 1, wherein the annular pebble bed region comprises a driver fuel layer disposed between an inner radial blanket pebble layer and outer radial pebble blanket layer;

the inner radial blanket pebble layer being adjacent the inner reflector, and outer radial pebble blanket layer being adjacent the outer reflector.

3. A reactor as recited in claim 2, wherein the driver fuel layer comprises a plurality of axial layers comprising alternating seed and blanket pebble zones;

the alternating seed and blanket pebble zones configured to allow reduced power peaking.

4. A reactor as recited in claim 3, wherein the blanket pebbles comprise graphite blanket pebbles or thorium-bearing blanket pebbles containing coated particles of thorium.

5. A reactor as recited in claim 4, wherein the blanket pebbles comprise a mixture of thorium and uranium.

6. A reactor as recited in claim 4, wherein the seed pebbles comprise coated particles containing fissile uranium or plutonium fuel.

7. A reactor as recited in claim 6, wherein the seed pebbles comprise recycled U-233, plutonium, or a mixture of plutonium and other transuranics.

8. A reactor as recited in claim 2, further comprising:
a plurality of partition rings disposed at the pebble injection inlet;
wherein the partition rings control the radial location for pebbles injected into the annular pebble-bed region to generate the alternating radial layers of seed pebbles and blanket pebbles.

9. A reactor as recited in claim 2, further comprising:
a plurality of dividers disposed at the pebble injection inlet;
wherein the dividers control the azimuthal location for pebbles injected into the annular pebble-bed region to generate alternating azimuthal layers of seed pebbles and blanket pebbles.

10. A reactor as recited in claim 8, wherein the partition rings comprise an outer partition ring that delineates the outer radial blanket pebble layer from the driver fuel layer provide shielding of the outer reflector from neutrons generated by fission in seed pebbles, and an inner partition ring that delineates the inner radial blanket-pebble zone from the driver fuel layer to provide shielding of the inner reflector from neutrons generated by fission in seed pebbles.

11. A reactor as recited in claim 1, wherein the pebble injection annulus and the pebble defueling slot are configured to be substantially subcritical.

12. A reactor as recited in claim 1, wherein the angle of the coolant flow reaching the outer reflector is configured such that a transverse hydrodynamic force on the pebbles is capable of overcoming friction between the pebbles and outer reflector.

13. A reactor as recited in claim 1:
wherein the outer reflector further comprises a plurality of outer injection ports leading into the bottom end of the pebble bed region;
wherein the reactor is configured such that coolant may be injected into the lower portion of the annular pebble bed core from the outer injection ports of the outer reflector and oscillated periodically between the outer injection ports and inner injection ports to agitate the pebble bed.

14. A reactor as recited in claim 1:
wherein the inner reflector has a control channel at its center;
wherein the control channel is configured such that pebbles may be injected at a bottom inlet of the control channel, and defueled from a top outlet of the control channel; and
wherein reactivity of the reactor may be controlled by varying the rate of injection and defueling of pebbles into the control channel to vary the inventory of pebbles in the channel.

15. A reactor as recited in claim 1, further comprising:
a pebble injector at the pebble bed inlet;
the pebble injector comprising a plurality of entrance vanes;
wherein a coolant flow entering the bottom of the pebble injection annulus is swirled by the entrance vanes; and
wherein the swirling flow in the annulus alters a deposition pattern of injected pebbles at a bottom of the pebble bed.

16. A reactor as recited in claim 1:
wherein the defueling slot is configured to permit sufficient residence time for decay of short-lived fission products prior to removal from the core.

17. A reactor as recited in claim 3:
wherein the outer radial pebble blanket layer is configured to provide neutron shielding.

* * * * *